(12) United States Patent
Porikli

(10) Patent No.: US 7,835,586 B2
(45) Date of Patent: Nov. 16, 2010

(54) METHOD FOR FILTERING IMAGES WITH BILATERAL FILTERS

(75) Inventor: Fatih M. Porikli, Watertown, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 776 days.

(21) Appl. No.: 11/832,084

(22) Filed: Aug. 1, 2007

(65) Prior Publication Data

US 2009/0034865 A1 Feb. 5, 2009

(51) Int. Cl.
*G06K 9/40* (2006.01)
*G06K 9/64* (2006.01)
(52) U.S. Cl. ...................... 382/260; 382/279
(58) Field of Classification Search .............. 382/166, 382/260–269, 274, 275, 279, 305, 312; 358/463; 708/300; 375/350
See application file for complete search history.

(56) References Cited

U.S. PATENT DOCUMENTS

| 7,082,218 | B2 * | 7/2006  | Pollard et al.   | 382/167 |
| 7,352,911 | B2 * | 4/2008  | Maurer           | 382/260 |
| 7,426,312 | B2 * | 9/2008  | Dance et al.     | 382/254 |
| 7,430,334 | B2 * | 9/2008  | Keshet et al.    | 382/260 |
| 7,599,569 | B2 * | 10/2009 | Smirnov et al.   | 382/260 |
| 7,643,699 | B2 * | 1/2010  | Lim et al.       | 382/275 |
| 7,783,121 | B1 * | 8/2010  | Cox              | 382/254 |

* cited by examiner

*Primary Examiner*—Kanji Patel
(74) *Attorney, Agent, or Firm*—Dirk Brinkman; Gene Vinokur

(57) ABSTRACT

A method filters an input image to produce an output image. A bilateral filter is composed of a spatial filter and a range filter. Pixel intensities in the input image are multiplied by each other to produce the set of power images, which approximate the application of the range filter. The spatial filter is applied to the set of power image to determine responses, and the responses are combined on a pixel-by-pixel basis to produce a bilaterally filtered output image.

11 Claims, 8 Drawing Sheets

Reshuffling - Single Input Access (Offline) Find Unique Coefficients $w_i, i = 1, \ldots, U$ — 310
(Offline) Extract Relative Links $l_{ij}$ — 330
for all $p \in [N_1, N_2]$ do
    $multiplier \Leftarrow I(p)$
    for all $1 \leq i \leq U$ do
        $value \Leftarrow multiplier \cdot w_i$
        for all $l_{ij}$ do
            $k \Leftarrow k + l_{ij}$
            $y(k) \Leftarrow y(k) + value$
        end for
    end for
end for

*Fig. 3C*

METHOD FOR FILTERING IMAGES WITH BILATERAL FILTERS

FIELD OF THE INVENTION

This invention relates generally to filtering data, and more particularly, to filtering data with bilateral kernel filters.

BACKGROUND OF THE INVENTION

Kernel Filters

In signal and data processing, and particularly, in image speech processing, kernel filters are frequently applied to input data to produce enhanced output data. A kernel filter works by applying a function to every point in a set of data. In the case of images, the points are pixels.

Typically, a kernel filter includes a kernel and a function defined on the kernel. The kernel, which is often a rectangular area of pixels in a 2D image, specifies the region of support for the function. The function is usually in the form of a matrix of filter coefficients. The coefficients of the matrix are the multiplication factors that determine the contribution of each point within the kernel, to generate a response of the filter. After all the underlying input data have been multiplied by the filter coefficients, the response at the current point is determined by taking the sum of the products. By selecting different kernel functions, different types of filtering can be performed.

Filtering can be computationally demanding. Therefore, conventional approaches try to break down the original kernel into a convolution of smaller kernels using. However, a large number of multiplications are needed to carry out all of the convolutions with a large set of kernels.

Filtering can be accelerated by substituting pixels in the kernels with the central pixel of a code vector. A sum-box filter approximates a large kernel linear filter to a factor by the sum of the translated outputs of sum-box filters. That technique is limited to Gaussian filters. In a fuzzy domain, a recursive and separable low-pass filter can be used. However, that method is only applicable to symmetric filters. There are also methods to decompose non-linear filters into a sum of separable one-dimensional filters or cascaded representations. That can be done by either an eigenvalue expansion of the 2D kernel, or by an application of singular value decomposition.

Filter can be adapted to a specific orientation by making a linear combination of basis filters. Another method generates a finite basis, which approximates an anisotropic Gaussian filter. By taking advantage of the separability of the 2D Gaussian function, an anisotropic Gaussian kernel can be decomposed into a 1D Gaussian filter followed by another filter in a nonorthogonal direction.

Bilateral Filters

A bilateral, filter combines a spatial filter with a range filter. The coefficients of the spatial filter vary according to distances, and the coefficients of the range filter vary according intensities. Because the range filter is non-linear, bilateral filtering is computationally demanding. One method for bilateral filtering uses as a single iteration of the diagonal normalized steepest descent algorithm. Another method derives criteria for down sampling in space and intensity to accelerate the bilateral filter. Other methods use reconfigurable hardware or processor adapted software to accelerate the filtering process.

The known methods for spatial filtering are either restricted to Gaussian kernels or linear functions. Bilateral filtering methods tend to decrease the amount of data by down sampling and result in a coarse approximation. It is desired to provide a bilateral filter method that is accurate and fast.

SUMMARY OF THE INVENTION

The embodiments of the invention provide a method for applying bilateral filters to an image. Some bilateral norms can be expressed as a mixture of spatial filters without any approximation. Other bilateral norms, including Gaussian norms, can use second and third order approximations without any degradation of the filter response.

The present method determines a set of unique filter coefficients, and constructs a set of relative links for each unique coefficient. Then, the image is processed by accumulating filter responses, while applying the set of unique coefficients using their relative links.

The method takes advantage of overlaps between kernels of neighboring pixels to avoid the redundant operations. To further decrease the total number of operations, the method quantizes the coefficients while keeping distortion to a minimum. In addition to the computational advantage, the method uses a minimal amount of memory, and is suitable for parallel implementation. Unlike conventional methods, the method according to the invention can process any arbitrary shaped kernel, and is not restricted to Gaussian assumptions.

BRIEF DESCRIPTION OF THE DRAWINGS

FIG. 3C is a block diagram of pseudocode of a filtering method according to an embodiment of the invention;

DETAILED DESCRIPTION OF THE PREFERRED EMBODIMENTS

Figure 6:
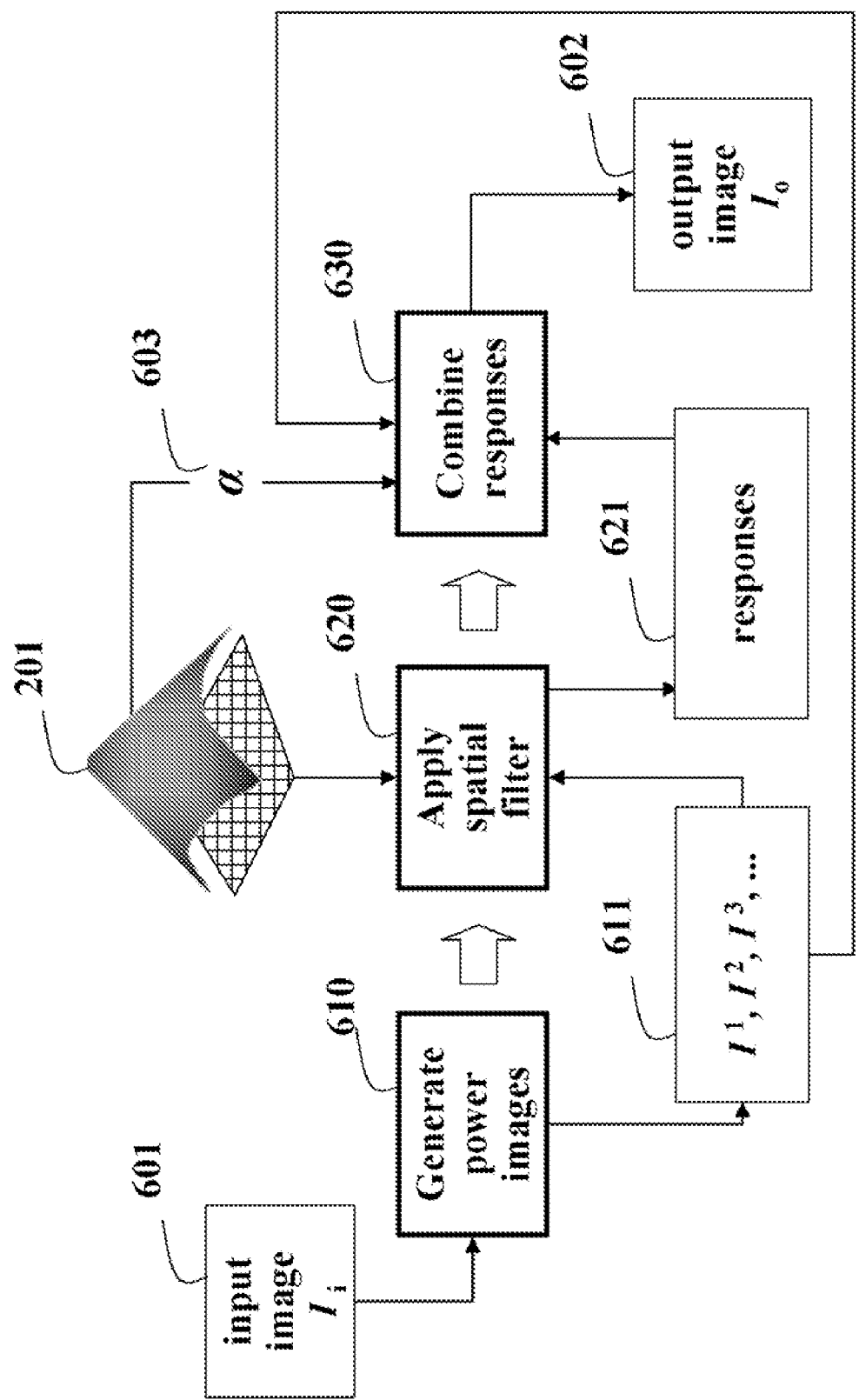
FIG. 6 is a flow diagram of a method for filtering an input image to produce an output image according to an embodiment of the invention.

FIG. 6 shows a method for filtering an input image $I_i$ 601 to produce an output image $I_o$ 602 according to an embodiment of the invention. First, a set of power images $I^1, I^2, I^3, \ldots,$ 611 are generated 610 from the input image 601. In the power images, $I^n$, the pixel intensities are raised to a power n or multiplied by each other, i.e., $I^1(p)=I_i(p)$, $I^2(p)=I_i(p)I_i(p)$, and $I^3(p)=I_i(p)I_i(p)I_i(p)$. The number of power images that are used depends on the number of terms in a Taylor expansion that is used to approximate an application of a range filter portion of a bilateral filter, see below.

A spatial filter 201 is applied to the set of power images 611 to determine filter responses 621. The application of the spatial filter can be performed as a sum of a set of separable low-dimensional filters. The responses 621 are combined 630 on a pixel-by-pixel basis to produce the bilaterally filtered output image 602. The combining can include multiplication and addition as describe below, see Equations (5-9). The method and the value α603 are described in greater detail below.

Kernel Filters

Figure 1:
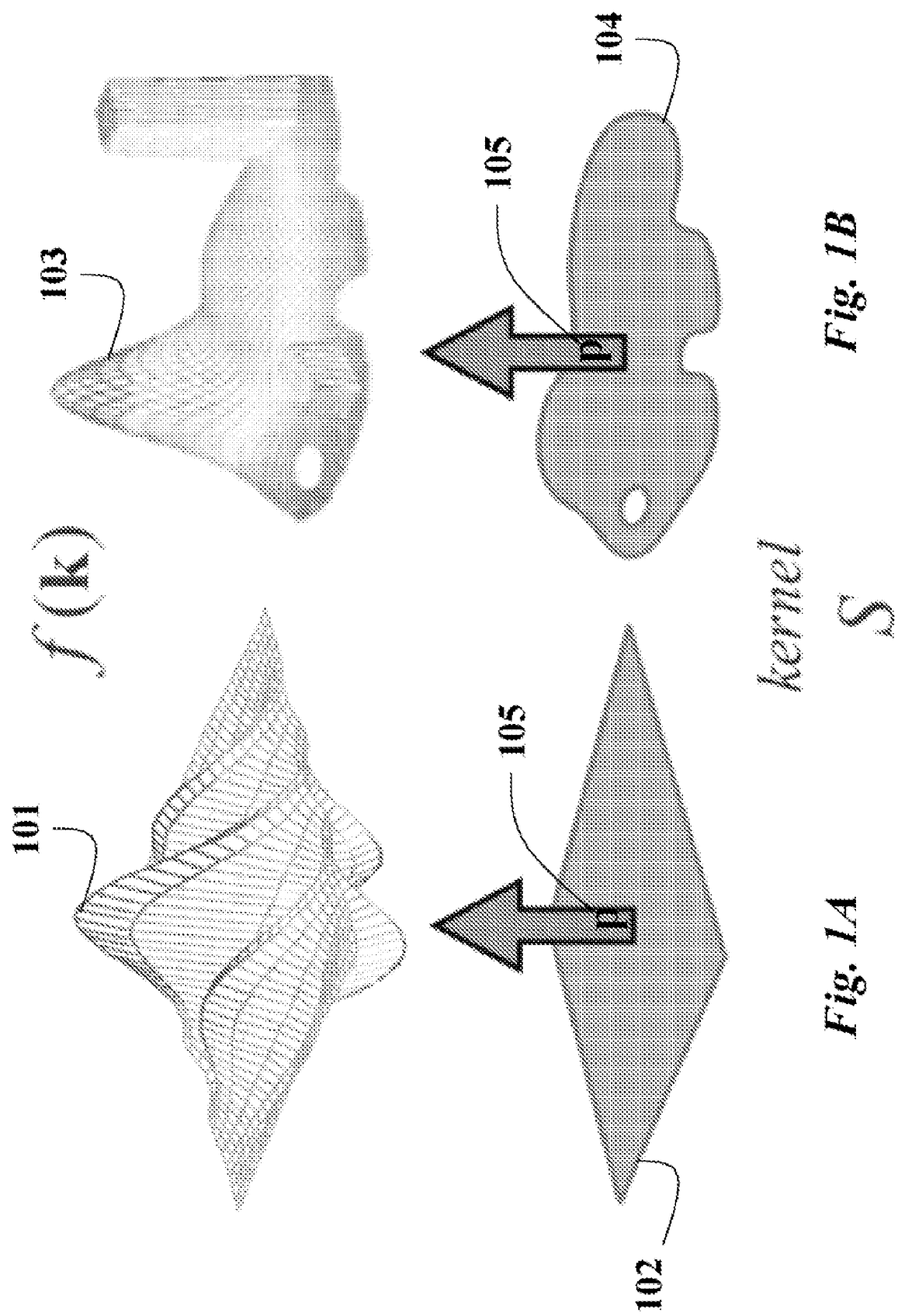
FIGS. 1A-1B are schematics of spatial filters according to an embodiment of the invention.

As shown in FIG. 1A-B, a filter f(k) is a mapping defined in a d-dimensional Cartesian space $\mathfrak{R}^d$. FIG. 1A shows a spatial Gabor filter f(k) 101 and its support kernel S 102. FIG. 1B shows an arbitrary spatial filter 103 and its kernel 104. The filter assigns an m-dimensional response vector $y(p)=[y_1, \ldots, y_m]$ to each point 105 (pixel) $p=[x_1, \ldots, x_d]$ in a data set (image) I bounded within $N_1, \ldots N_d$, and $0 \leq x_i < N_i$. Generally, only a small set of pixels within a region of the support kernel S is used to determine the filter response.

The region of support which is centered on the pixel p, is the kernel. Without loss of generality, the filter maps to a scalar value, i.e., m=1 and $y(p)=y_1$. Although the invention is described for filtering 2D images, the method can be applied to data having other dimensions, e.g., 1D acoustic signals, 3D volumetric data or other dimensional data. Therefore, p is a pixel in a 2D image, and generally a point is a data sample having other dimensions.

Kernel filters apply coefficients f(k) to the values of pixels k+p in its kernel k ∈ S. If the values of the coefficients depend only on the spatial locations, then the filter corresponds to a spatial filter. If the filter can be represented by a linear operator, e.g., as a matrix multiplication, the filter is considered linear.

For example, a 2D Gaussian smoothing operator is a linear spatial filter in which the coefficients change according to their spatial distances from the center pixel. Given the above notation, the response of a linear spatial filter can be expressed as $$y(p) = \kappa^{-1} \sum_{k \in S} f(k) I(k+p), \quad (1)$$

where $\kappa = \Sigma f(k)$ is a constant to avoid bias. Equation (1) expresses the convolution of the function $f$ and the image I. For simplicity of this description, the support kernel for the filter is square, and the filter is normalized.

Bilateral Filters

A bilateral filter combines a spatial filter and a range filter. Bilateral filtering extends Gaussian smoothing by weighting the filter coefficients with corresponding relative pixel intensities. Pixels that are very different in intensity from the central pixel are weighted less even though the pixels are close to the central pixel. This is effectively a convolution with a non-linear Gaussian filter having weights based on pixel intensities.

Therefore, the coefficients of the spatial filters vary according to distances, and the coefficients of the range filter vary according intensities. A bilateral filter multiplies the pixel value in its spatial kernel S by the corresponding spatial filter coefficient f(k) and range coefficient h(k, p). The range coefficient is a function of the intensity difference, i.e., h(I(k)–I(k+p)).

Figure 2:
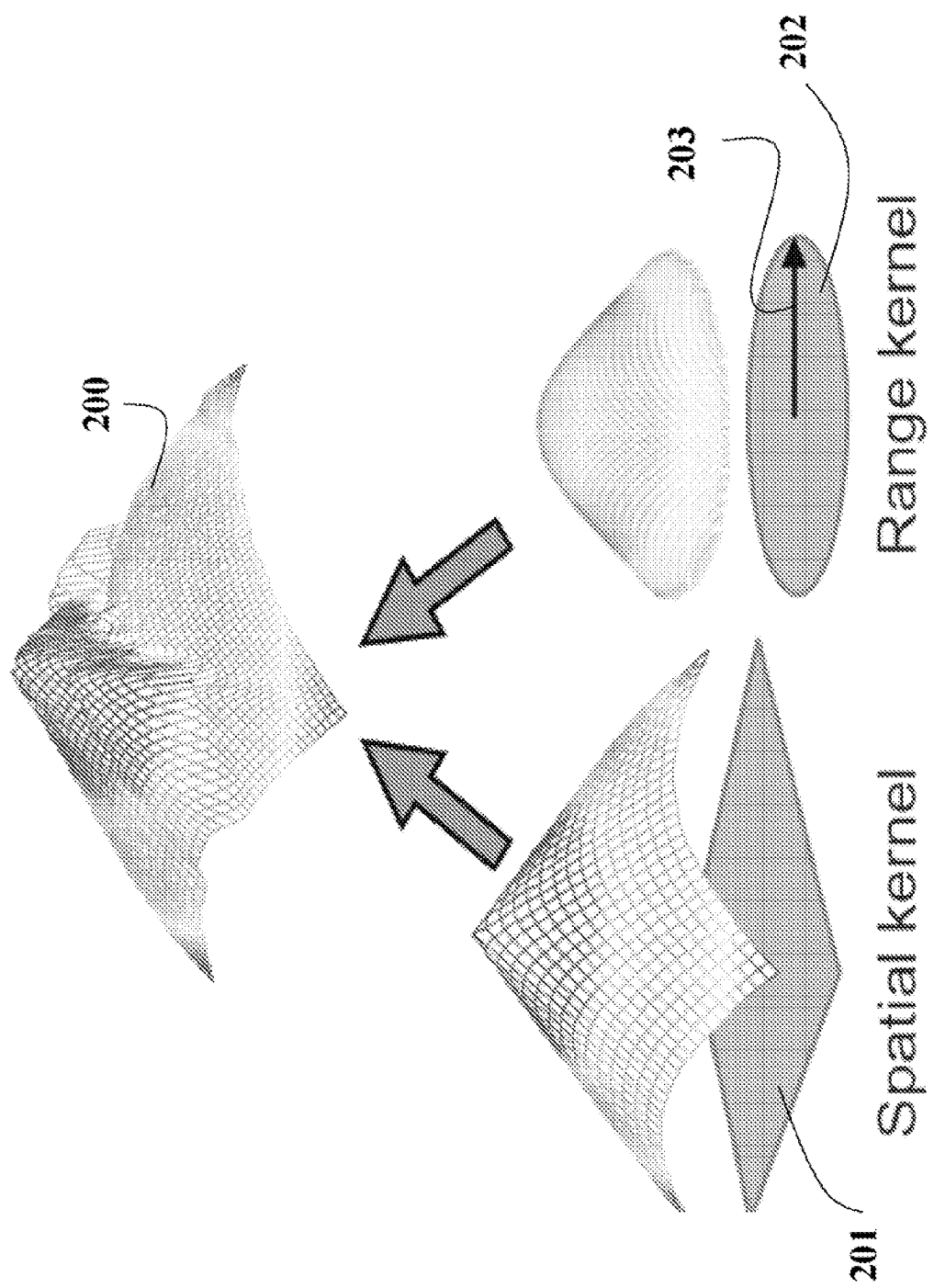
FIG. 2 is a schematic of a bilateral filter according to an embodiment of the invention.

FIG. 2 shows a bilateral filter 200. The filter 200 combines a spatial kernel 201 with a range kernel 202. The range kernel is based on intensity distances 203. Due to the range filtering, the bilateral filter is a non-linear filter, and the filter response cannot be obtained by a simple matrix multiplication.

The response of the bilateral filter 200 is $$y_b(p) = \kappa_b^{-1} \sum_{k \in S} f(k) h(I(k+p) - I(p)) I(k+p), \quad (2)$$

Where $$\kappa_b = \Sigma f(k) h(I(k) - I(k+p))$$

is a function of the intensity difference. Unlike the spatial filter function, the filter function $\kappa_b$ changes at every pixel p. To effectively impose the smoothness constraint, the range function h is selected as a Gaussian function.

The present method uses an exact solution of the square distance norms, and a Taylor series expansion of a Gaussian norm of a squared distance function to approximate the application of the range filter. The method does not have any restriction on the spatial filter f. Norms are used because they are differentiable and can be expressed or approximated in terms of linear transforms.

The square distance norm is $$[1 - (I(k+p) - I(p))^2]^n, \quad (3)$$

where n determines an order of a parabolic norm of the squared distance function. For n=1 and $\Sigma f(k)=1$, the response of the bilateral filter as expressed in Equation (2) can be rewritten as $$y_b(p) = \kappa_b^{-1} \Big[ \sum f(k) I(k+p) - I^2(p) \sum f(k) I(k+p) + \quad (4)$$
$$2I(p) \sum f(k) I^2(k+p) - \sum f(k) I^3(k+p) \Big]$$
$$= \kappa_b^{-1} [y_1(p)[1 - I^2(p)] + 2y_2(p) I(p) - y_3(p)]$$
$$= \kappa_b^{-1} [y_1[1 - I^2] + 2y_2 I - y_3],$$

where the index p is omitted for simplicity. From the above Equations, it can be seen that the response is a function of power images.

The spatial filter responses of the power images 611 $I^1, I^2, I^3, \ldots$ are $y_1, y_2, y_3, \ldots$, respectively. That is, the superscripts of the responses indicate the powers applied to the input image. For example, the images $I^1, I^2, I^3$ are equal to the powers of the input image, e.g., $$I^1(p) = I^1(p), I^2(p) = I(p) I(p), \text{ and } I^3(p) = I(p) I(p) I(p).$$

In the power image, the pixel intensities are multiplied by each other to approximate the application of the range filter.

A normalizing parameter is equal to $\kappa_b = 1 - I^2 + 2y_1 I(p) - y_2$. The normalizing parameter has a similar form as the norm. Equation (2) can be written as $$y_b = y_1 [1 - 2I^2 + I^4] + 4y_2 [I - I^3] + y_3 [6I^2 - 2] - 4y_4 I + y_5$$

$$\kappa_b^{-1} = 1 - 2I^2 + I^4 + 4y_1 [I - I^3] + y_2 [6I^2 - 2] - 4y_3 I + y_4, \quad (5)$$

for n=2. Equation five indicates that five power images are used according to $y_1, \ldots, y_5$.

Equations (4-5) express the corresponding square distance bilateral filters in terms of spatial filtering without any approximations. Any desired filter function, including arbitrary kernel functions, can be selected for the spatial filter f.

The Gaussian norm of a squared distance function for the range kernel is $$\exp(-\alpha [I(k+p) - I(p)]^2), \quad (6)$$

where α 603 is $\sqrt{\sigma}$, and σ is the variance of the Gaussian function. Equation (6) is simplified by disregarding $\exp(-\alpha I^2(p))$, which is compensated by the normalizing parameter and does not vary locally:

$$\exp(-\alpha[I^2(p)-2I(p)I(k+p)]), \quad (7)$$

which corresponds to an exponential norm of the squared distance function.

Equation (6) can be expanded to form a Taylor series. The number of terms in the expansion determines the accuracy of the approximation. Generally, the Taylor series represents the function as a sum of terms determined from the values of its derivatives at a single point. By applying a Taylor expansion to Equation (6), second and third approximations of the Gaussian bilateral filter are obtained as $$y_b = y_1 + 2\alpha y_2 I + y_3[2\alpha^2 I^2 - \alpha] - 2\alpha^2 y_4 I + 0.5\alpha^2 y_5 \quad (8)$$

$$y_b = y_1 + 2\alpha y_2 I + y_3[2\alpha^2 I^2 - \alpha] - 2y_4[\alpha^2 I - (2/3)\alpha^3 I^3] + y_5 [0.5\alpha^2 - 2I^2\alpha^3] + \alpha^3 y_6 I - (\alpha^3/6)y_7 \quad (9)$$

Equation 9 indicates seven power images according to $y_1, \ldots, y_7$. Obviously, the more power images, the better the approximation of the range filtering, at the expense of processing time.

Therefore, the bilateral filter 200 can be interpreted as a weighted combination or sum 630 of the spatial filtered responses 621 of the power image 611 derived from the input image 601.

Reshuffling

The above formulations require repeated and time-consuming multiplications with the same coefficients when the kernel contains identical coefficients, regardless of their position within the kernel. Therefore, the identical filters are reduced to a single unique filter.

Off-Line Phase

Figure 3A:
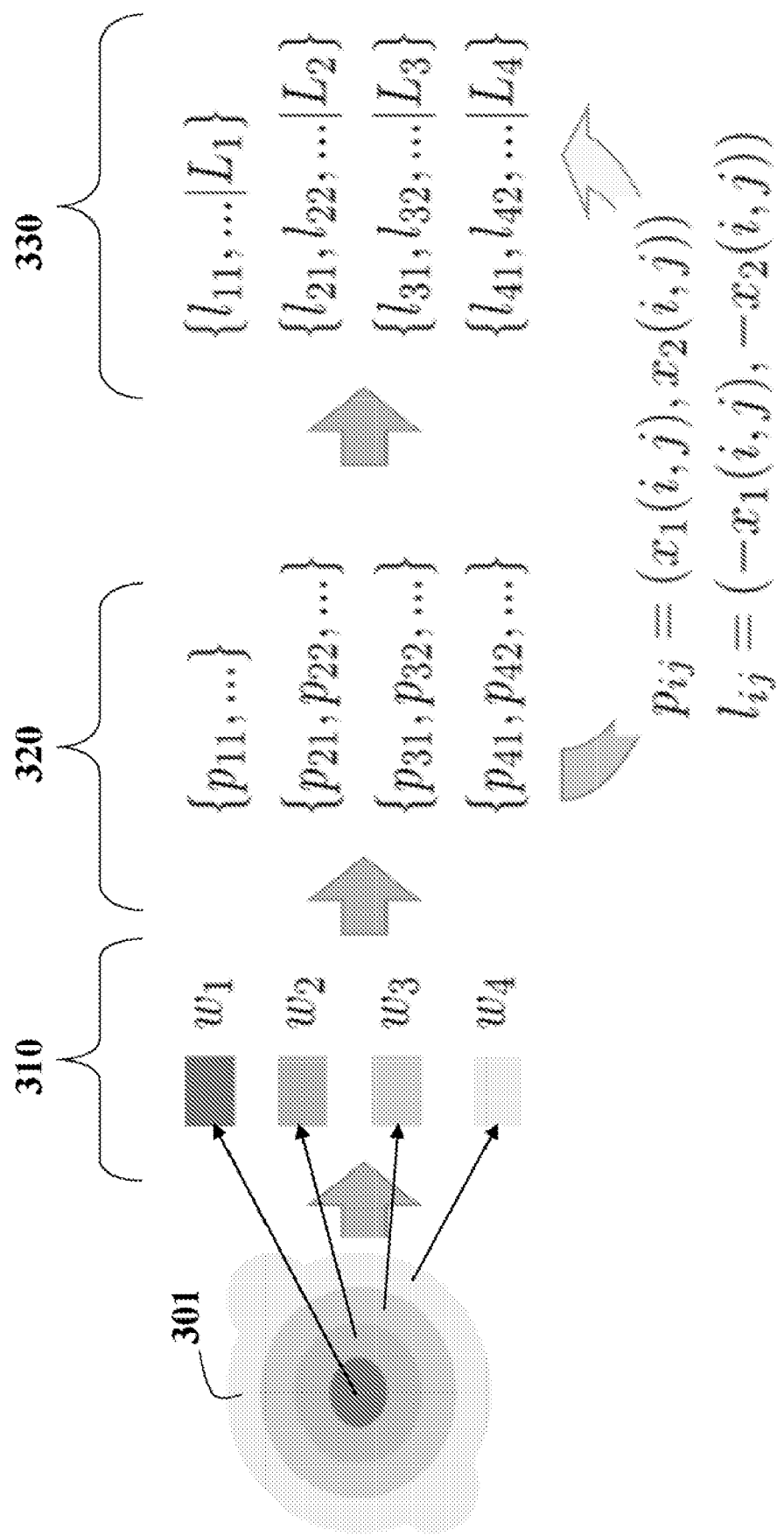
FIG. 3A is a block diagram of an off-line phase of a filtering method according to an embodiment of the invention.

Instead of multiplying the spatial filter matrix with the image data, the method according to the embodiments of the invention, as shown in FIG. 3A, determines unique spatial filter coefficients 310 in an off-line phase as shown in FIG. 3A. Each unique spatial filter coefficient is multiplied once by the image pixels 320. The result is added to the corresponding output pixels using relative links 330.

Figure 3B:
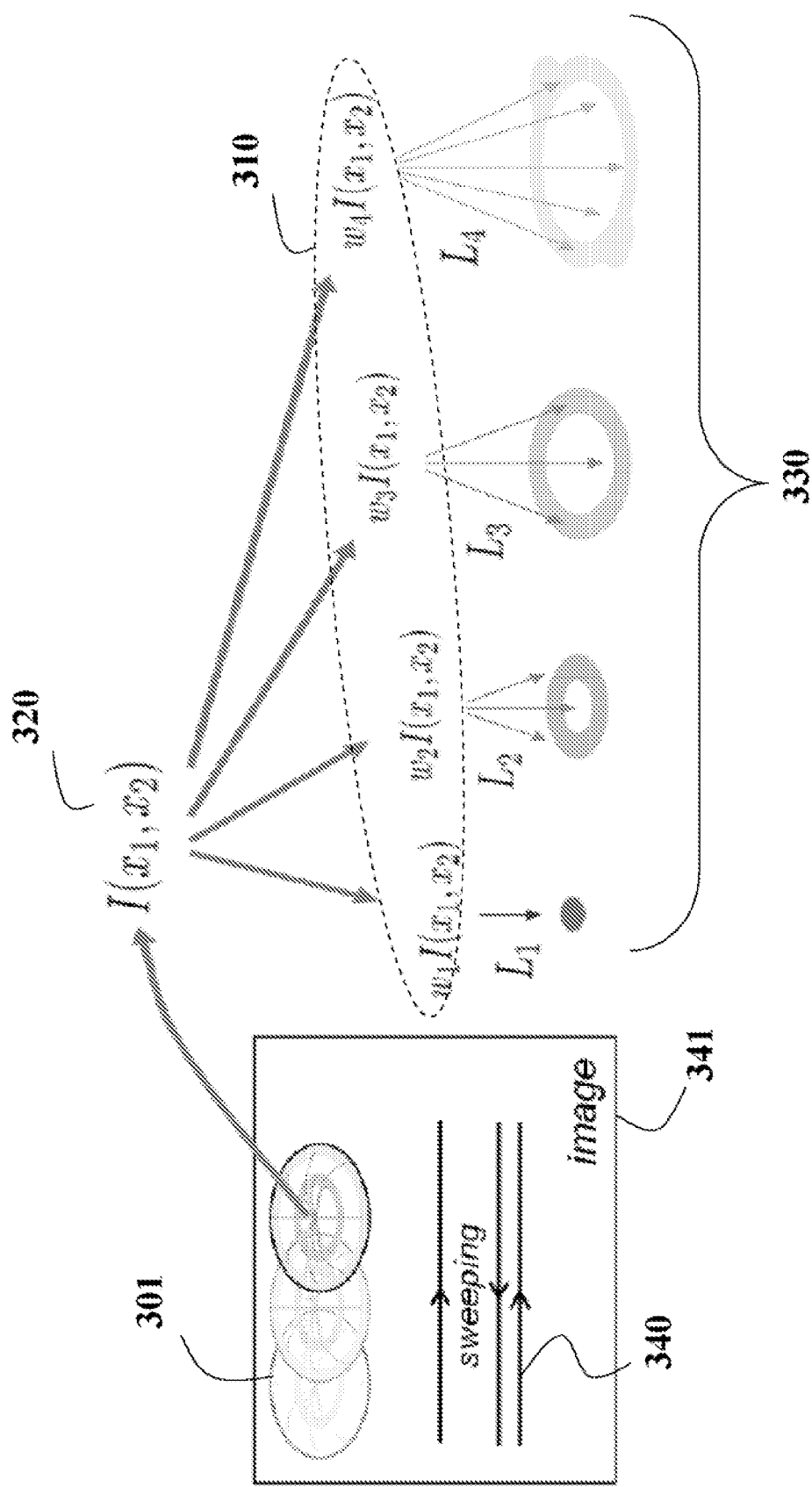
FIG. 3B is a block diagram of an on-line phase of a filtering method according to an embodiment of the invention.

Therefore, the filtering method according to one embodiment of the invention first determines the set of unique spatial filter coefficients $w_i$, $i=1, \ldots, U$ 310 for the spatial filter 301 as shown in FIGS. 3A-3C. Then, based on the points (pixel) 320, the method constructs a linkage set $L_i$ 320 for each unique filter coefficient $w_i$ such that the linkage set includes relative links to the positions in the filter that have identical filter coefficients $$L_i = \{l_{i0}, \ldots, l_i L_i\}.$$

Each relative link $l_{ij}$ is an inverse of the position of the filter coefficient. If the filter position is $(x_1, x_2)$ then the relative link is $(-x_2, -x_2)$ with respect to indexing the kernel. The unique filter coefficients and relative links are predetermined one time for the kernel filter in an off-line or preprocessing phase.

On-line Phase

After the unique spatial filter coefficients 310 and relative links 330 are determined, The pixels in the input image can be processed one at a time. The pixel values 320 on which the spatial kernel is centered are multiplied by each of the unique filter coefficients 310. The result is added to the responses of the multiple output points as referenced by the relative links 330:

$$w_1 I(p) \rightarrow y(p + l_{11}), \ldots, y(p + l_{1L_1}) \quad (10)$$
$$\vdots \rightarrow \vdots$$
$$w_U I(p) \rightarrow y(p + l_{U1}), \ldots, y(p + l_{UL_U}).$$

As shown in FIG. 3A, the minimalist filtering method first determines the unique filter coefficients $w_i$, $i=1, \ldots, U$ 310 for each position in some arbitrarily shaped spatial kernel 301 in a one time, the off-line phase. Then, the method determines the points 320 that have the same coefficients, and the corresponding relative links 330. That is, the method determines:

$$p_{ij} = (x_1(i,j), x_2(i,j)), \text{ and}$$

$$l_{ij} = (-x_1(i,j), -x_2(i,j)).$$

FIG. 3B shows the on-line phase of my method where the kernel 301 is 'swept' 340 across the image 341, e.g., in a line or 'raster' scan order. For data point (pixel) $I(x_1, x_2)$ 320, the points are weighted 310 using the corresponding relative links 330.

Instead of multiplying the filter matrix directly with the underlying data, the minimalist filtering method selects the unique filter coefficients 310, and then multiplies the input pixel values 320 only once for each unique filter coefficient, while adding the results to the corresponding output pixels using the corresponding relative links 330.

This method is suitable for stream processors where a size of a memory cache is limited. Thus, the amount of data that needs to be accessed is minimized. In a single input access mode, the filter response is progressively determined, and the output is produced when all the points in the kernel are processed as shown in the pseudocode of FIG. 3C.

After obtaining the unique coefficients 310 and relative links 330, the pixels 320 are processed one at a time. The current value the kernel that is centered on the pixel is multiplied by each of the unique coefficient and added to the result to the responses of the multiple output pixels as referenced by the relative links.

In a single access to the input data, the filter response is progressively determined, and the output is obtained when all the pixels in the kernel are processed as shown in FIG. 3C.

This method is suitable for the stream processors where the local cache size is small, thus, limited data can be transmitted over the local bus between the cache and the processing units.

Figure 4:
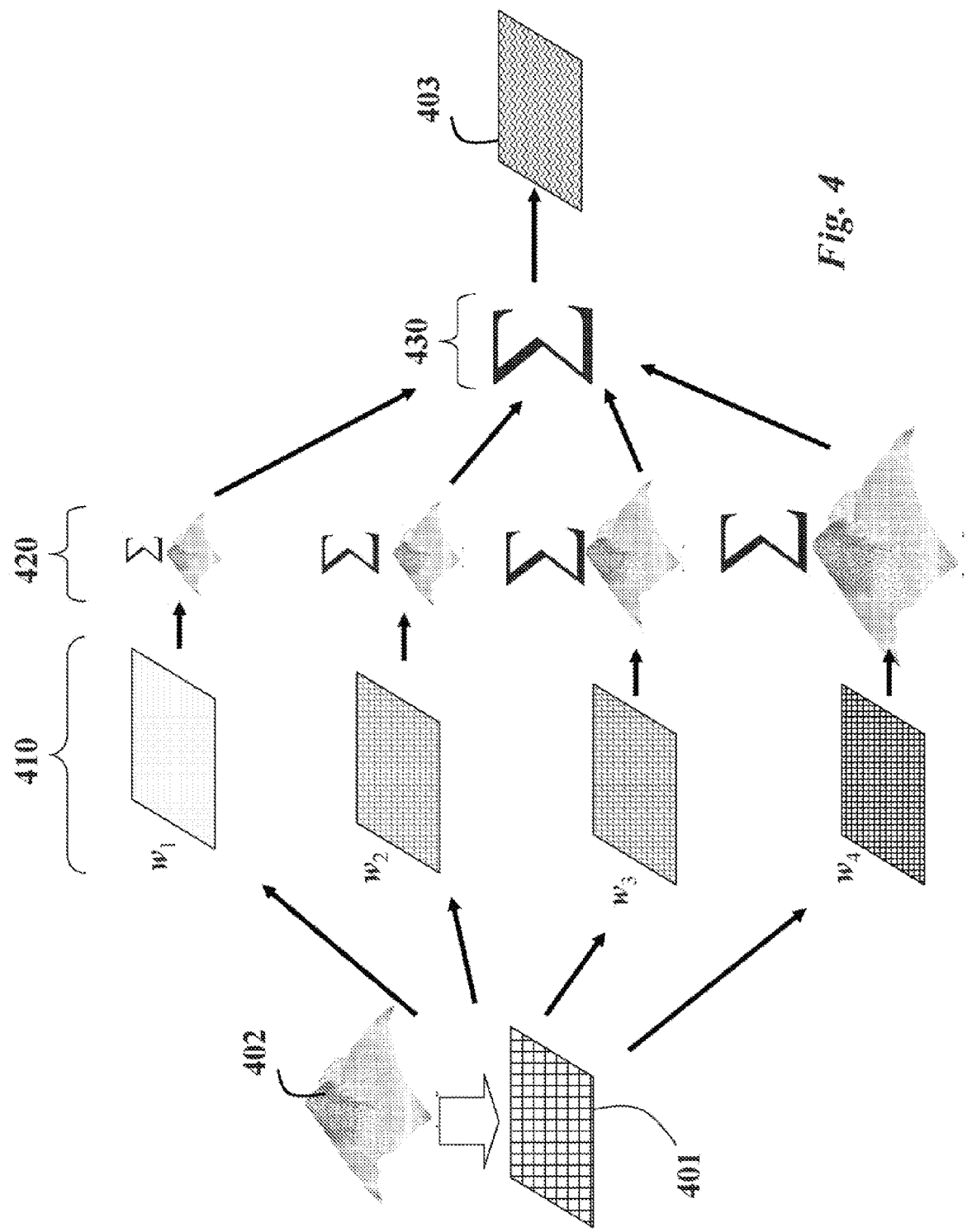
FIG. 4 is a block diagram of a dual filtering method according to an embodiment of the invention.

FIG. 4 shows a dual method for filtering an image 401 with a bilateral filter kernel 402 to produce a filtered image 403. A kernel sized block 410 of input is processed each iteration. As above, the unique coefficients $w_i$ and the relative link sets are determine off-line. The dual method takes the inputs within the current kernel and finds the summation 420 of the points for each relative link. Then, the method multiplies these summations with the corresponding unique coefficients to assign the value of the output point and aggregates 430 the sums:

$$y(p) = \sum_i^U \left( w_i \sum_j^{L_j} I(p + l_{ij}) \right).$$

Because the image is multiplied just once for each unique coefficient, the method can take advantage of the modern graphic processing units to further accelerate the filtering. It should be understood that the methods can also be implemented in a digital processor or application specific integrated circuit (ASIC), or GPU.

Figure 5:
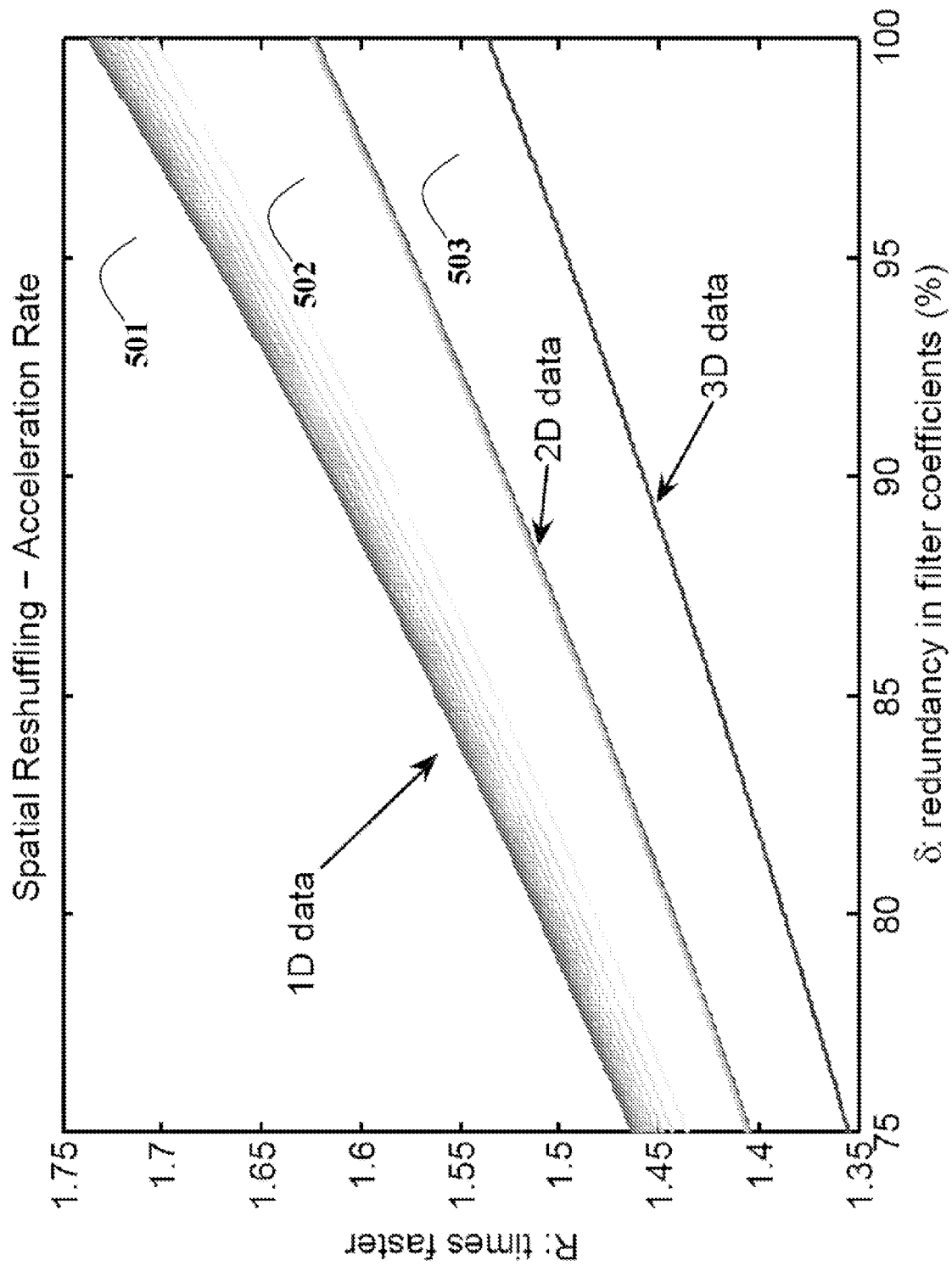
FIG. 5 is a graph comparing the acceleration rate as a function of redundancy for the method according to an embodiment of the invention.

As shown FIG. 5, the reshuffling becomes more advantageous as the redundancy of unique coefficients increases. FIG. 5 shows acceleration rates R for 1D 501, 2D 502, and 3D data. As an advantage, most filters have a small number of unique coefficients. For any 2D symmetric spatial filter, the minimum redundancy score is 75%. The acceleration rate R increases as the dimensionality decreases, partially as a result of the array accessing costs. The acceleration is much higher for one-dimensional data. Using separable kernels, the reshuffling can provide even higher gains. For higher dimensions, the acceleration R becomes independent of the filter size.

The method can be further accelerated when the spatial filter is separable. This enables filtering operations to be performed in parallel while maintain the quality of the filtering. According to Equation (1), the 2D linear spatial filter is a convolution of the input signal I with the filter impulse response $f_{2D}$. In the case of a rectangular kernel where $0 \leq x_1 < S_1, 0 \leq x_2 < S_2$, the 2D convolution requires $S_1 \times S_2$ multiplications for each output pixel. A separable 2D filter $f_{2D}$ can be expressed in terms of two 1D vectors $$f_{2D} = g_{1D} h_{1D}.$$

Typically $g_{1D} = h_{1D}$. This imposes rectangular symmetry on the resulting 2D filter by taking the outer product of the two 1D filters. The impulse response is separable and can be written as a product of two 1D impulse responses. If the filter is separable, the convolution operation can be performed using only $S_1 + S_2$ multiplications for each output pixel. By applying the 2D separable filter, Equation (1) becomes:

$$\begin{aligned} y(p) &= y(p_1, p_2) \\ &= \sum_{x1}^{S1} \sum_{x2}^{S2} f_{2D}(x_1, x_2) I(x_1 + p_1, x_2 + p_2) \\ &= \sum_{x1}^{S1} \sum_{x2}^{S2} g_{1D}(x_1) h_{1D}(x_2) I(x_1 + p_1, x_2 + p_2) \\ &= \sum_{x1}^{S1} g_{1D}(x_1) H_{1D}(x_1 + p_1, x_2) \\ &= G_{1D}(H_{1D}(I)), \end{aligned}$$

where G and H are 1D filtered images. To perform the separable convolution, the filter $H_{1D}$ is applied to the image as though it is a $S_2 \times 1$ filter. Then, the filter $G_{1D}$ is applied as a $1 \times S_1$ filter.

It is also possible to determine the finite impulse response of the separable filter with sums of simple and lower dimensional filters, which decrease the number of operations. Thus, 2D filtering is accomplished by pairs of 1D filters, all acting concurrently on the image, with each 1D filter in a pair acting either in the $x_1$ or $x_2$ direction.

The method takes advantage of the separable filters by applying each low-dimensional filter to the set of power image to determine the responses and then combining the responses of the set of low-dimensional filters responses to produce the bilaterally filtered output image.

Effect of The Invention

The method according to the invention accelerates the application of bilateral filters. The method takes advantage of the overlap between the kernels to avoid redundant multiplications. The method can accelerates 2D filtering up to 1.6 times. Unlike conventional methods, the present method is not limited to Gaussian functions. Any arbitrary shaped kernel can be used.

Some bilateral filters can be expressed exactly, and the Gaussian norms, (down to $\sigma=0.2$), can be approximated accurately using a non-linear mixture of spatial filtering and power image powers. This enables 4.7 to 7 times acceleration for bilateral filtering.

The method can be performed in parallel. By using separable kernels, computational savings increases. The method uses a small amount of memory and is therefore suitable for hardware implementations.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A method for filtering an input image to produce an output image comprising:
   defining a bilateral filter comprising a spatial filter and a range filter;
   generating a set of power images from an input image to approximate an application of the range filter, in which pixel intensities in the input image are multiplied by each other to produce the set of power images;
   applying the spatial filter to the set of power image to determine responses; and
   combining the responses on a pixel-by-pixel basis to produce a bilaterally filtered output image.

2. The method of claim 1, in which the combining includes multiplication and addition of the responses and the power images.

3. The method of claim 1, in which the spatial filter includes an arbitrary kernel and an arbitrary function.

4. The method of claim 1, in which the range filter is a Gaussian norm of a squared distance function.

5. The method of claim 1, in which the range filter is a parabolic norm of a squared distance function.

6. The method of claim 1, in which the range filter is an exponential norm of a squared distance function.

7. The method of claim 1, in which the combining produces a normalizing parameter, and further comprising:
   multiplying the responses by the normalizing parameter.

8. The method of claim 4, further comprising:
   applying a Taylor series expansion to the Gaussian norm; and
   determining a weighted sum from lower order terms of the Taylor series that include the set of power images and the response of the set of power images.

9. The method of claim 1, in which the spatial filter is a sum of a set of separable low-dimensional filters.

10. The method of claim 9, further comprising:
    applying each low-dimensional filter to the set of power image to determine the responses; and
    adding the responses of the set of low-dimensional filters responses to produce the bilaterally filtered output image.

11. The method of claim 1, further comprising:
    determining unique coefficients of the spatial filter;
    constructing a linkage set for the unique coefficients;
    multiplying the set of power images by each unique coefficient to obtain multiplied power images; and summing the multiplied power images to produce the bilaterally filtered output image.

* * * * *